United States Patent [19]

Berson et al.

[11] 3,721,924

[45] March 20, 1973

[54] VARIABLE DELAY LINE UTILIZING ONE PART REFLECTION TYPE AMPLIFIER

[75] Inventors: Bertrand Edward Berson, Trenton; Chainulu Lakshminarsimha Upadhyayula, Cranbury, both of N.J.

[73] Assignee: RCA Corporation, New York, N.Y.

[22] Filed: May 19, 1971

[21] Appl. No.: 144,878

[52] U.S. Cl. ........................333/31 R, 333/1.1, 333/7

[51] Int. Cl. ........................H01p 1/18

[58] Field of Search ...............330/5; 333/1.1, 7, 31 R

[56] References Cited

UNITED STATES PATENTS

| | | | |
|---|---|---|---|
| 3,305,797 | 2/1967 | Clavin | 333/1.1 |
| 3,466,563 | 9/1969 | Thim | 330/5 X |
| 3,509,478 | 4/1970 | Thim | 330/5 |

*Primary Examiner*—Paul L. Gensler
*Attorney*—Edward J. Norton

[57] ABSTRACT

A microwave delay line includes a first path of negligible delay time, a second path providing a predetermined delay time determined by a delay line section terminated by a one port reflection type amplifier, and a control for selectively feeding a microwave signal over one of the paths. A signal can be held in the delay line section of the second path to thereby impart a desired delay to that signal.

5 Claims, 9 Drawing Figures

INVENTOR.
BERTRAND EDWARD BERSON
CHAINULU L. UPADHYAYULA
BY Edward J. Norton
ATTORNEY

VARIABLE DELAY LINE UTILIZING ONE PART REFLECTION TYPE AMPLIFIER

DESCRIPTION OF THE PRIOR ART

Previous techniques for constructing a digitally variable microwave delay line with a relatively long delay time have not been entirely successful. One approach is to direct a microwave signal along a selected microwave transmission path that has a desired delay time by virtue of its physical length. As the desired delay time increases, the length of the microwave transmission path has to be increased proportionately. The physical length of the transmission line required for a relatively long delay time and the attenuation of a microwave signal due to a long transmission line become problems in the practical use of this approach.

A solution to the attenuation problem has been to include a two port microwave amplifier in the path of microwave transmission. The gain of the amplifier compensates for the attenuation of the microwave signal due to the length of the microwave transmission path. However, the provision of undesirable lengths of transmission line in order to provide relatively long delay time has not been adequately solved.

SUMMARY OF THE INVENTION

A delay line includes a directional device having an input port, a second port and an output port. The directional device is of the type providing a non-reciprocal path for signal transmission in a direction only from the input port to the second port and a further non-reciprocal path for signal transmission in a direction only from the second port to the third port. A switch is connected between the second port and the first terminal of a two terminal delay means. The second terminal of the delay means is terminated by a one port reflection type amplifier. A signal fed to the input port passes to the second port, through the switch in its closed position and the delay means, is amplified by the reflection type amplifier, returns to the second port through the switch and delay means if the switch is in its closed position. The signal then passes from the second port to the third or output port of the delay line. If, after the signal is passed to the delay means, the switch is placed in an open position, the signal from the amplifier is reflected by the open circuit for an additional round trip transmission through the delay means, the switch thereafter being closed to pass the amplified and delayed signal to the second port. The delay line can further include a second mode of operation for the delay line in which a signal is fed directly from the input port to the output port, by-passing the delay means.

These and other features and advantages of the invention will be better understood from a consideration of the following specification taken in conjunction with the accompanying drawing in which:

BRIEF DESCRIPTION OF THE DRAWINGS

FIG. 2(*a*) is a graph of Amplitude versus Time of an input microwave signal coupled to the delay line;

FIG. 2(*b*) is a graph of Amplitude versus Time of the output microwave signal coupled from the delay line when the switch 12 is in position 1;

FIG. 2(*c*) is a graph of Amplitude versus Time of the output microwave signal coupled from the delay line when the switch 12 is in position 2;

FIG. 4(*b*) is a graph of Amplitude versus Time of the output microwave signal coupled from the delay line when the switch 31 is in position 1;

FIG. 4(*c*) is a graph of Amplitude versus Time of pulse 1 of the output signal when the switch 31 is in position 2;

FIG. 4(*d*) is a graph of Amplitude versus Time of pulse 2 of the output signal when the switch 31 is in position 3.

Referring to FIG. 1, there is shown a schematic of a digitally variable microwave delay line. The directional properties of the three port ferrite circulator 10 transmits a microwave signal from one port to an adjacent port along a clockwise and non-reciprocal transmission path. A switch 12 is coupled between port 2 of the circulator 10 and the first terminal of the delay means or device 13. The purpose of the switch 12 is to selectively transmit or block the transmission of a microwave signal through the delay device 13. A single pole double throw switch 12 is used by way of illustration. The single pole double throw switch 12 selectively provides a path of microwave transmission from the switch input terminal 11 to only a desired output position, either position 1 or position 2.

Figures 4A, 4B, 4C, 4D:
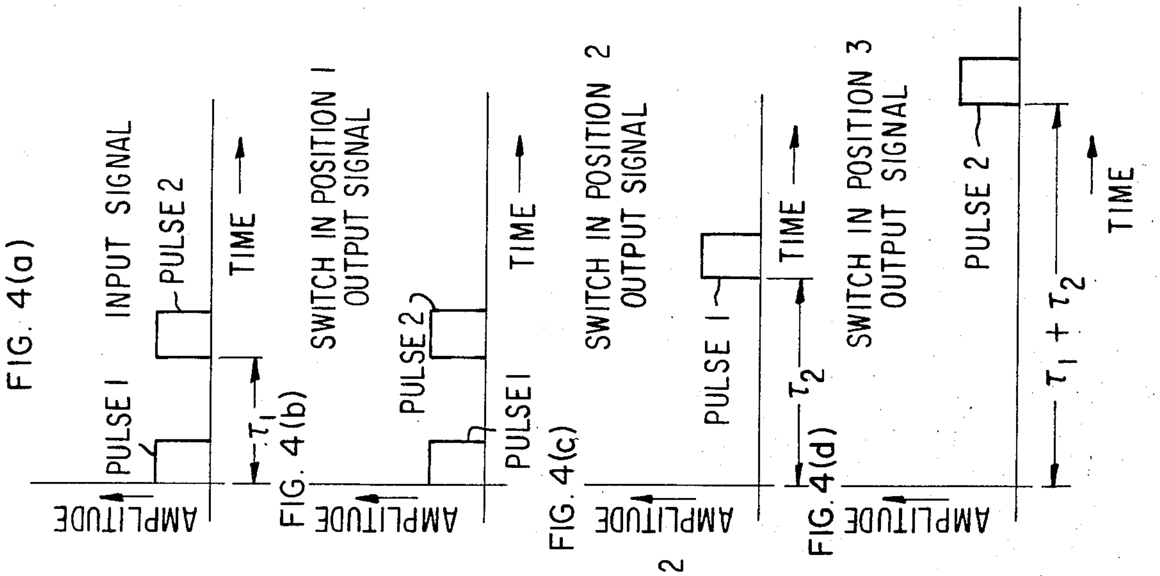
FIG. 4(*a*) is a graph of Amplitude versus Time of an input microwave signal coupled to the delay line.

One possible construction of a single pole double throw switch 12 is a combination of a first crystal diode coupled from the switch input terminal 11 to position 1 and a second crystal diode coupled from the switch input terminal 11 to position 2. A crystal diode is turned on when an applied D.C. bias voltage drives the diode into its forward conduction region. In this state, the diode presents a low resistance and a good transmission path for a microwave signal. Conversely, the diode presents a high resistance and a poor transmission path for a microwave signal when the polarity of the applied D.C. bias voltage is reversed. Therefore, a path of microwave transmission from the input terminal 11 to a desired output position is determined by the polarity of the applied bias voltage.

Position 1 of the switch 12 is terminated by a microwave short circuit or reflection plane. Position 2 of switch 12 is connected to one terminal of the delay means 13. The second terminal of the delay device 13 is coupled to a one port reflection type amplifier 14. An example of a delay device 13 is a length of microwave transmission line that delays a microwave signal for a predetermined time. A one port reflection type amplifier is a device that utilizes a negative resistance semiconductive device to amplify an incident microwave signal, i.e., the microwave signal reflected from the amplifier is an amplified version of the microwave signal incident on it. An example of such an amplifier is a transferred electron amplifier disclosed by Pearlman and Walsh in U.S. Pat. No. 3,644,839, issued Feb. 22, 1972, and assigned to the same assignee as the present invention. Other negative resistance semiconductive devices such as avalanche diodes and tunnel diodes have been used in the construction of one port reflection type amplifiers.

The delay time required for an applied microwave signal to be transmitted from port 1 to the output port, port 3, of the circulator 10 is negligible when the switch 12 is in position 1. Under these conditions, the applied microwave signal is transmitted in a clockwise direction from port 1 to port 2 of the circulator 10. The microwave signal at port 2 is reflected by the short circuit 15 terminating position 1 of the switch 12. The directional properties of the circulator 10 continues the clockwise and non-reciprocal direction of microwave transmission and the signal reflected at port 2 is coupled from port 3.

However, when the switch is in position 2, a transmission path from port 2 to the delay device 13 is completed and the applied microwave signal is transmitted through the delay device 13. The microwave signal is delayed by a time determined by the delay device 13 and attenuated by the transmission loss inherent in the delay device 13. The delayed and attenuated signal is amplified by the one port reflection type amplifier 14 and transmitted a second time through the delay device 13 toward position 2 of the switch 12. The gain of the amplifier 14 is adjusted to compensate for the round trip transmission loss suffered by the microwave signal when transmitted through the delay device 13. If the switch 12 is still in position 2, the microwave signal is passed through the switch 12 to port 2 of the circulator 10. The directional properties of the circulator 10 continues the clockwise and non-reciprocal direction of microwave transmission to port 3 of the circulator. Thus, the delay of a microwave signal directed along this path of microwave propagation is substantially equal to the time required for a round trip transmission through the delay device 13.

A longer delay time is provided by transmitting the microwave signal many times through the delay device 13 before it is transmitted to port 3. One method that accomplishes this result is to switch the transmission path from position 2 to position 1 while the microwave signal is being transmitted through the delay device 13 for the first time. Position 2 now appears as an open circuit and a high microwave impedance to the return microwave signal transmitted from the amplifier 14. The high microwave impedance presented by position 2 causes the signal to be reflected back through the delay device 13 toward the amplifier 14. Damage or non-operation of the one port reflection type amplifier 14 may result if the amplifier 14 is directly terminated by the high microwave impedance of an open circuit. However, the attenuation provided by the delay device 13 is selected to reduce the mismatch of the open circuit to a level acceptable for the amplifier 14 operation. The procedure for multiple transmissions of the microwave signal through the delay device 13 is repeated until the desired delay time is reached. When this event occurs, the switch 12 is switched back to position 2, and the delayed signal is transmitted in a clockwise direction from port 2 toward port 3.

Referring to FiG. 2(*a*), there is shown a graph of amplitude versus time of a microwave input pulse applied to port 1 of the circulator 10. FIG. 2(*b*) is a graph of amplitude versus time of the microwave pulse coupled from port 3 or the output port of the circulator 10 when the switch 12 is in position 1. A comparison of FIGS. 2(*a*) and 2(*b*) indicate that the resulting microwave pulse at port 3 of the circulator 10 has negligible change in amplitude and delay time. FIG. 2(*c*) is a graph of amplitude versus time of the microwave pulse coupled from port 3 of the circulator 10 when the switch is in position 2. A comparison of FIGS. 2(*a*) and 2(*c*) indicate that while the amplitude of the output microwave pulse is unchanged, the microwave pulse is delayed by a desired time $\tau_1$.

Figures 1, 2A, 2B, 2C, 3:
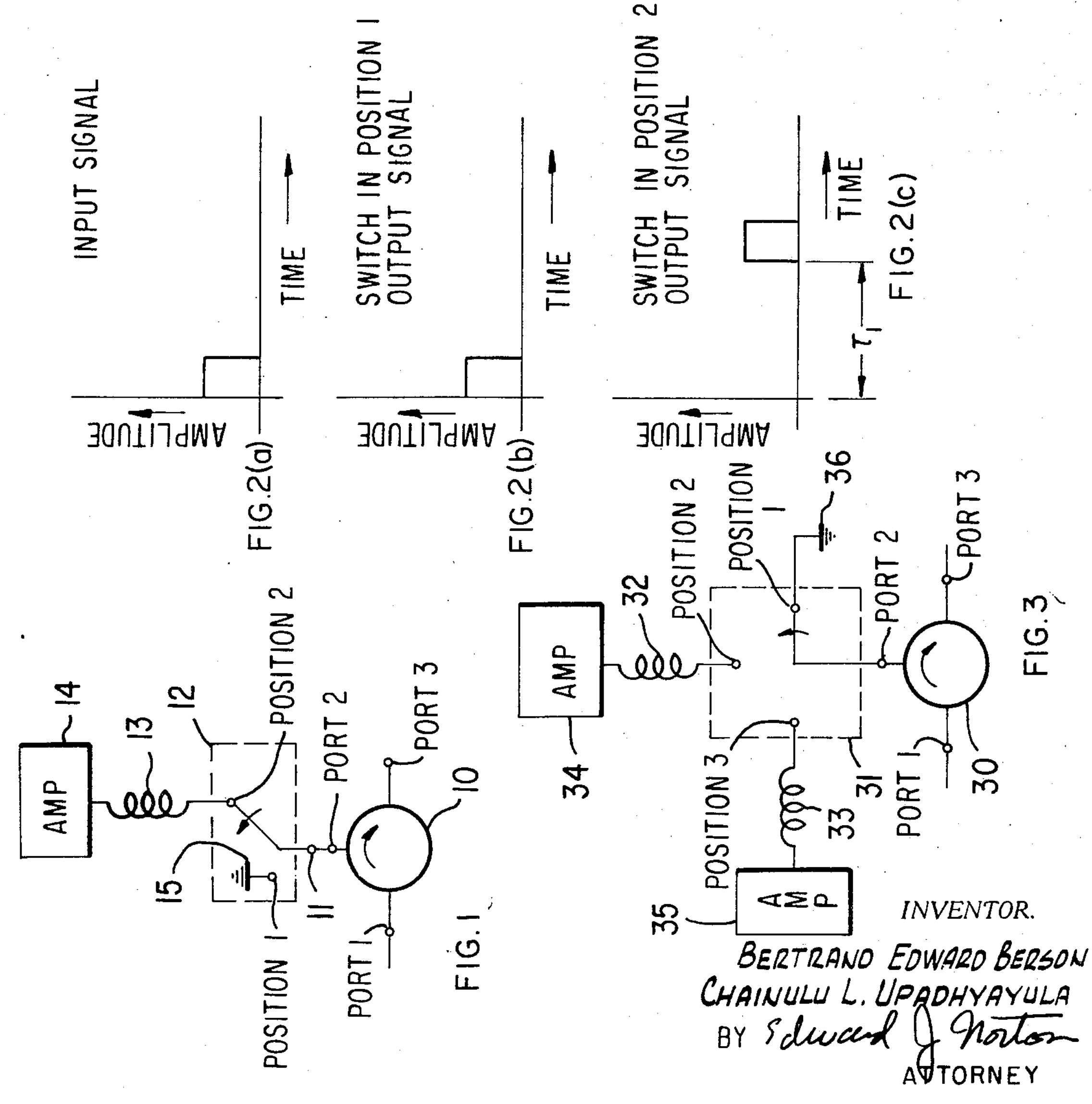
FIG. 1 is a schematic of a variable microwave delay line according to one embodiment of the invention.
FIG. 3 is a schematic of a variable microwave delay line according to a second embodiment of the invention.

Referring to FIG. 3, there is shown a schematic of a microwave system that utilizes the previously discussed principles but applies them to a microwave signal consisting of a series of pulses closely spaced in time. The desired delay of the microwave signal is longer than the time interval between microwave pulses. The microwave system in FIG. 3 includes a three port directional and non-reciprocal ferrite circulator 30. A single pole three position switch 31 is coupled to port 2 of the circulator 30. Position 1 of the switch 31 is terminated by a microwave short circuit 36. A first two terminal delay device 32 has a first terminal coupled to position 2 of the switch 31 and a second terminal terminated by a one port reflection type amplifier 34. A second two terminal delay device 33 has a first terminal coupled to position 3 of the switch 31 and a second terminal also terminated by a one port reflection type amplifier 35.

Referring to FIG. 4(*a*), there is shown a graph of amplitude versus time of a microwave signal consisting of a series of pulses separated by a period $\tau_1$. The desired delay time, $\tau_2$, of the microwave signal is longer than $\tau_1$. FIG. 4(*b*) is a graph of amplitude versus time of the output microwave signal coupled from port 3 when the switch 31 is in position 1. A comparison of FIGS. 4(*a*) and 4(*b*) indicate negligible change in amplitude and delay time between the input signal and the output signal, when the switch is in position 1. As discussed with reference to FIG. 1, the short circuit 36 terminating position 1 reflects the applied microwave signal from port 2 and continues the transmission in a clockwise direction toward port 3 or the output port of the circulator 30.

FIG. 4(*c*) is a graph of amplitude verses time of pulse 1 of the output signal. A comparison of the characteristics of input pulse 1 in FIG. 4(*a*) and output pulse 1 in FIG. 4(*c*) indicates that the output pulse 1 is delayed by a time interval of $\tau_2$ and there is negligible amplitude difference between the pulses. This is accomplished by transmitting the input microwave signal coupled to port 1 in a clockwise direction through the circulator 30 toward port 2. The switch 31 is now in position 2 and pulse 1 of the applied microwave signal is transmitted through the first delay device 32 toward its terminating amplifier 34. The switch 31 is then changed to position 3 after pulse 1 is transmitted past position 2 of the switch 31 but before pulse 2 of the input microwave signal can be transmitted past position 2. Input pulse 2 is also transmitted in a clockwise direction through the circulator 30 and through position 3 of the switch 31 toward the second delay device 33. The output pulse 1 is coupled from port 3 of the circulator 30 after the input pulse 1 has been delayed for the desired period $\tau_2$ by the first delay device 32 and the switch 31 has been changed from position 3 back to position 2.

FIG. 4(*d*) is a graph of amplitude versus time of pulse 2 of the output signal. A comparison of the characteristics of pulse 2 of the input microwave signal in FIG. 4(*a*) and pulse 2 of the output signal in FIG. 4(*d*) indicates that the output pulse 2 is delayed by a time interval of $\tau_2$. There is also negligible amplitude difference between the pulses. The delay of pulse 2 coupled from port 3 of the circulator 30 is accomplished by switching from position 2 back to position 3 after pulse 2 has been delayed for a period $\tau_2$ by the second delay device 33. The gain of the amplifiers 34, 35 are adjusted to compensate for the attenuation of the delay devices 32, 33.

A preferred embodiment of the invention has been shown and described. Various other embodiments and modifications thereof will be apparent to those skilled in the art, and will fall within the scope of invention as defined in the following claims.

What is claimed is:

1. A delay line comprising in combination, a directional device having an input port, a second port and an output port, said directional device having a non-reciprocal path for signal transmission in a direction from said input port to said second port and a further non-reciprocal path for signal transmission in a direction from said second port to said output port, a switch having an input terminal and means for selectively providing a conductive path from said input terminal to at least a first output terminal and a second output terminal, a power dissipating delay means having a first and second terminal, and a one port reflection type amplifier responsive to an incident signal, means for reflecting signals, means for coupling said input terminal of said switch to said second port, means for coupling said first output terminal of said switch to said first terminal of said delay means, means for coupling said second terminal of said delay means to said one port reflection type amplifier, means for terminating said second output terminal of said switch with said signal reflecting means, whereby said switch provides a selection between a first transmission path including said signal reflecting means and a second transmission path including said delay means and said one port reflection type amplifier for an input signal transmitted from said input port to said output port of said directional device, the delay of an input signal transmitted from said input port to said output port of said directional device being substantially determined by at least a first and second passage of said input signal through said delay means when said switch provides said conductive path from said second port to said first terminal of said delay means, the gain of said amplifier being determined to compensate for the attenuation of said signal transmitted through said delay means.

2. A delay line according to claim 1 wherein said directional device is a three port ferrite circulator.

3. A delay line comprising, a first transmission path of negligible delay time, a delay means having a pair of terminals, a one port reflection type amplifier, means forming a second transmission path by connecting said amplifier to one terminal of said delay means so that an input signal applied to the other terminal of said delay means passes through said delay means, is amplified by said amplifier, the amplified signal returning back through said delay means to said other terminal, and switching means providing in one condition an input signal conductive path to said other delay means terminal and in a second condition a reflective termination for said other delay means terminal and an input signal conductive path to said first transmission path by which an input signal can be selectively fed over one of said first and second transmission paths, said switching means being operative to provide successive multiple transmissions of a delayed and amplified signal along said second transmission path upon the feeding in said one condition of said switching means of said input signal to said second transmission path via said other delay means terminal by the setting thereafter of said switching means in said second condition to provide said reflective termination for said other delay means terminal and the input signal conductive path to said first transmission path.

4. A delay line comprising in combination, a circulator having an input port, a second port and an output port, said circulator being of the type having a non-reciprocal path for signal transmission in a direction from said input port to said second port and a further non-reciprocal path for signal transmission in a direction from said second port to said output port, a switch having an input terminal coupled to said second port and a first and second output terminals, a two terminal delay means, a microwave short circuit, and a one port reflection type amplifier responsive to an incident signal, means for terminating said first output terminal of said switch with said microwave short circuit and for coupling said delay means between said second output terminal of said switch and said one port reflection type amplifier, whereby said switch provides a selection between a first transmission path including said short circuit and a second transmission path including said delay means for an input signal transmitted from said input port to said output port of said circulator, said first path having a negligible delay time and said second path having a delay time substantially determined by at least a first and second passage of said input signal through said delay means.

5. A delay line comprising in combination, a circulator having an input port, a second port and an output port, said circulator being of the type having a non-reciprocal path for signal transmission in a direction from said input port to said second port and a further non-reciprocal path for signal transmission in a direction from said second port to said output port, a switch having an input terminal coupled to said second port and a first, second and third terminals, a first and second two terminal delay means, a microwave short circuit, and a first and second one port reflection type amplifier responsive to an incident signal, means for terminating said first terminal of said switch with said microwave short circuit, means for coupling said first delay means between said second terminal of said switch and said first one port reflection type amplifier, and means for coupling said second delay means between said third terminal of said switch and said second one port reflection type amplifier.

* * * * *

UNITED STATES PATENT OFFICE
CERTIFICATE OF CORRECTION

Patent No. 3,721,924 Dated March 20, 1973

Inventor(s) Bertrand E. Berson et al

It is certified that error appears in the above-identified patent and that said Letters Patent are hereby corrected as shown below:

Change the title from "Variable Delay Line Utilizing One Part Reflection Type Amplifier" to read --Variable Delay Line Utilizing One Port Reflection Type Amplifier--.

Signed and sealed this 20th day of November 1973.

(SEAL)
Attest:

EDWARD M.FLETCHER,JR.
Attesting Officer

RENE D. TEGTMEYER
Acting Commissioner of Patents